United States Patent [19]

Brecker et al.

[11] Patent Number: 5,656,202
[45] Date of Patent: Aug. 12, 1997

[54] METHOD FOR MAKING OVERBASED PVC STABILIZER

[75] Inventors: Lawrence R. Brecker, Armonk, N.Y.; Radu Bacaloglu, Hamburg, N.J.; Michael Fisch, Wayne, N.J.; Mukund Shah, Hazlet, N.J.; Otto Loeffler, Colts Neck, N.J.

[73] Assignee: Witco Corporation, Greenwich, Conn.

[21] Appl. No.: 492,627

[22] Filed: Jun. 20, 1995

[51] Int. Cl.$^6$ .............................. C23F 11/12; C23F 11/18
[52] U.S. Cl. .................. 252/400.52; 524/399; 524/400; 2552/400.62
[58] Field of Search ................ 252/400.52, 400.62; 524/399, 400; 554/156, 158; 562/493

[56] References Cited

U.S. PATENT DOCUMENTS

| | | | |
|---|---|---|---|
| 2,968,642 | 2/1961 | Le Suer | 524/171 |
| 2,971,014 | 2/1961 | Mastin | 508/586 |
| 2,989,463 | 6/1961 | Mastin | 508/457 |
| 3,004,000 | 10/1961 | Kauder | 252/400.52 |
| 3,262,896 | 7/1966 | Ackerman | 524/114 |
| 3,390,111 | 6/1968 | Scullin | 252/400.52 |
| 3,446,749 | 5/1969 | Weisfeld et al. | 252/400.52 |
| 3,454,514 | 7/1969 | Baum | 252/400.52 |
| 3,928,267 | 12/1975 | Rhodes et al. | 252/400.52 |
| 3,943,081 | 3/1976 | Brook | 252/400.52 |
| 4,111,873 | 9/1978 | Lordes, III | 524/82 |
| 4,123,399 | 10/1978 | Gay | 524/101 |
| 4,269,743 | 5/1981 | Halyalkar et al. | 524/567 |
| 4,369,273 | 1/1983 | Snel | 524/89 |
| 4,661,544 | 4/1987 | Quinn | 524/109 |
| 4,665,117 | 5/1987 | Quinn | 524/327 |
| 4,675,356 | 6/1987 | Miyata | 524/424 |
| 4,912,159 | 3/1990 | Hildebrand et al. | 524/289 |
| 4,954,557 | 9/1990 | Iwanami et al. | 524/394 |
| 4,963,608 | 10/1990 | Kunieda et al. | 524/394 |
| 5,102,933 | 4/1992 | Kook-Jin Bae et al. | 524/147 |
| 5,225,108 | 7/1993 | Bae et al. | 252/400.3 |
| 5,302,644 | 4/1994 | Worschech et al. | 524/186 |
| 5,322,872 | 6/1994 | Quinn | 252/400.52 |
| 5,534,566 | 7/1996 | Wehner et al. | 252/400.52 |

*Primary Examiner*—Sharon Gibson
*Assistant Examiner*—Valerie Fee
*Attorney, Agent, or Firm*—Scully, Scott, Murphy & Presser

[57] ABSTRACT

An overbased mixture of aliphatic and aromatic carboxylates salts useful in making low-fogging thermal stabilizers for PVC is made by reacting zinc oxide with fatty acid and such as stearic acid, then adding aromatic acids, and then adding and reacting one or both of magnesium oxide and calcium oxide, under controlled heating conditions to maintain fluidity while minimizing side reactions, and then conditioning the reaction product to remove volatiles.

9 Claims, No Drawings

METHOD FOR MAKING OVERBASED PVC STABILIZER

BACKGROUND OF THE INVENTION

The present invention relates to stabilizer compositions for polyvinyl chloride resins and to polyvinyl chloride resin compositions having improved resistance to degradation caused by heat coupled with a reduced tendency to emit "fog" of volatilized components. Although capable of a variety of uses, this invention finds advantageous utility in providing improved long term stability at moderate temperatures to motor vehicle components shaped from polyvinyl chloride resin compositions, especially where the polyvinyl chloride resin compositions are used in combination with urethane.

The problem of imparting to polyvinyl chloride a sufficient heat processing stability at temperatures at which the polymer becomes sufficiently fluid or softened to permit shaping is of course of long standing, and has been satisfactorily resolved by addition to the polymer of various combinations of known heat stabilizers. At processing temperatures, the resin can degrade, liberating hydrogen chloride, and discolor, become brittle, and stick to the equipment. These problems are overcome by combining with the polymer before heat processing or during heat processing one or more of the well established and successful conventional heat stabilizers, such as, for example, organotin stabilizers and/or barium-cadmium or barium-zinc salt stabilizers.

Although the well established and successful conventional heat stabilizers provide effective stabilization to the polymer at elevated heat processing temperatures during standard processing, they may not provide effective stabilization to the polymer at lower more moderate temperatures after such heat processing. For example, protection against discoloration at moderate temperatures over long periods is a particular problem with motor vehicle components shaped from polyvinyl chloride resin compositions despite such compositions having contained conventional heat stabilizers during their heat processing. Depending upon their location in the vehicle, these components may be exposed to varied amounts of light, and also different rather high (above ambient) temperatures in use, and these differences can degrade motor vehicle components at differing rates. One result is the volatilization of one or more components, or of decomposition products therefrom, which condense as "fog" on interior surfaces such as the windows and windshield. Additionally, when polyvinyl chloride resin compositions are associated with a polyurethane foam backing, e.g. automobile instrument panels, glove compartments, door handles, arm and head rests, the amine from the urethane can contribute to discoloration of the polyvinyl chloride resin composition.

DISCUSSION OF THE PRIOR ART

A number of stabilizing systems have been proposed for imparting polyvinyl chloride resin articles molded with a polyurethane foam backing with resistance to deterioration from exposure to long term moderate heat and from exposure to an amine from urethane. For example, the art has recognized the use of perchlorate salts in polyvinyl chloride resin stabilization and in particular in stabilizing polyvinyl chloride that is used in contact with polyurethane foam or plastic. This art, however, does not address the problem of "fog" and does not suggest how to alleviate that problem. For, instance, European Patent Application No. 861111174.8 discloses polyvinyl chloride resin stabilizer compositions comprising a 2,2, 6, 6-tetramethyl piperidinyl compound and an ammonium or metal perchlorate. This publication also discloses the use of such stabilizer compositions for polyvinyl chloride resin articles molded with polyurethane foam backing.

U.S. Pat. No. 4,861,816 discloses polyvinyl chloride compositions containing a stabilizer mixture of certain barium/zinc carboxylic acid salts and a metal perchlorate and/or perchlorate ion type hydrotalcite. According to the '816 patent the perchlorate and perchlorate ion type hydrotalcite compound give excellent amine resistance, particularly to urethane attached polyvinyl chloride sheets. U.S. Pat. No. 5,225,108 also discloses the use of metal perchlorates in PVC stabilizers, but does not address how to remedy the formation of "fog".

Other patents disclose PVC stabilizers but do not address the problems of "fog" formation nor or interaction with polyurethane components. For instance, U.S. Pat. No. 3,396, 132 and U.S. Pat. No. 5,102,933 disclose magnesium-zinc benzoate-stearate stabilizers with polyhydric alcohols and, in the case of U.S. Pat. No. 5,102,933, with beta-diketones. U.S. Pat. No. 4,950,704 also discloses the use of betadiketones for PVC stabilizers. None of these patents addresses the problem the tendency of the stabilized PVC to form "fog". U.S. Pat. No. 4,123,399 discloses combinations of beta diketones and polyhydric alcohols but it, too, does not suggest how to reduce the tendency of the stabilized PVC to form "fog".

There remains a need for PVC stabilizers which reduce the tendency of the stabilized PVC composition to form "fog" upon moderate heating, yet which retain heat stability and satisfactory processability in the stabilized PVC composition.

BRIEF SUMMARY OF THE INVENTION

The present invention satisfies the aforementioned objectives and affords as well the other advantages described herein.

One aspect of the present invention is a process for producing a mixture of carboxylate salts of one or more aromatic acids and one or more aliphatic acids containing at least about 16 carbon atoms with zinc and one or both of magnesium and calcium, comprising:

(a) dissolving zinc oxide in a molten acid precursor composed of an at least stoichiometrically equivalent quantity of said one or more aliphatic acids wherein up to about 10 mole percent of the amount of said one or more aliphatic acids present is replaced by one or more of said aromatic acids, in the presence of a small amount of water effective to increase the rate of reaction of said zinc oxide with said one or more acids, under conditions effective to achieve complete reaction between said zinc oxide and said acid precursor to maximize formation of the corresponding zinc carboxylate while minimizing formation of other reaction products and to provide thereby a liquid reaction product;

(b) adding said one or more aromatic acids to said liquid reaction product under conditions effective to maintain it in the liquid state while minimizing side reactions between said zinc carboxylate and said aromatic acids, wherein the mole ratio of said one or more aromatic acids to aliphatic carboxylates is 0.5:1 to 2:1;

(c) adding one or more of magnesium oxide, magnesium hydroxide, calcium oxide and calcium hydroxide to the product of step (b), in an amount effective to provide a stoichiometric excess thereof of up to about 2 wt. % based on the carboxylate, under conditions effective to achieve complete reaction of said one or more aromatic acids with said added compound or compounds to form said mixture of carboxylate salts while minimizing formation of side reaction products; and (d) conditioning the product of step (c) under conditions effective to volatilize and remove therefrom unreacted products and side reaction products.

In preferred embodiments of this invention, the aforesaid aliphatic acid is an alkanoic or alkenoic acid containing at least about 18 carbon atoms, more preferably stearate.

Polyvinyl chloride formulations which are stabilized against heat-mediated degradation and which exhibit a reduced tendency to volatilize upon exposure to moderate heat, comprise a polyvinyl chloride polymer and a heat stabilizer which comprises an effective amount of salt mixtures made using the process of the present invention. Such polyvinyl chloride formulations are particularly useful in the fabrication of shaped motor vehicle components, especially components comprising PVC and polyurethane.

DETAILED DESCRIPTION OF INVENTION

The reduced tendency of a polyvinyl chloride composition to form "fog" in use is also expressed herein as a reduced tendency of the composition to volatilize, by which is meant that the composition emits a reduced amount of, and preferably little or no, compounds into the ambient atmosphere when the composition is exposed to moderate heat, typically temperatures of about 60° to 130° C. (140° to 270° F.). Such compounds emitted by polyvinyl chloride compositions under such conditions can comprise one or more components of the polyvinyl chloride composition itself, products of the degradation of one or more components of the polyvinyl chloride composition, compounds formed by the reaction of any such emitted compounds or degradation products, or mixtures of any of the foregoing.

The present invention forms an overbased mixture that includes metal salts of one or more aromatic acids. The metal salts can be formed of two, or more, of the group consisting of calcium, magnesium, zinc, and barium. Preferably, barium is not present in the stabilizer composition at all, because of its reputed implication in health and environmental concerns. Also, it is preferred that the composition contains zinc. The term "aromatic acids" is used herein to mean benzoic acid wherein the phenyl ring either is unsubstituted, or is substituted with one, two or three alkyl groups each of which can contain 1 to 6 carbon atoms and can be straight or branched. Examples of such alkyl substituents include methyl, and tert-butyl. A preferred example of such a substituted benzoic acid is any toluic acid, such as meta-toluic acid. Mixtures of substituted and unsubstituted benzoic acid salts can also be used.

The mixture of salts also includes one or more salts of one or more fatty alkanoic and/or alkenoic aliphatic acids. Preferably, salts of such aliphatic acids are present, to impart increased lubricity. The fatty aliphatic acids useful in this component of the present invention have at least about 16 carbon atoms, up to about 30 carbon atoms. The preferred fatty aliphatic acid is stearate. Other useful fatty acids include lauric and behenic acids. The molar ratio of aromatic carboxylate to fatty aliphatic carboxylate can effectively lie in the range of 0.5:1 to about 2:1, preferably in the range of 0.8:1 to 1.2:1.

As indicated, the mixture of salts of aromatic and fatty aliphatic acid(s) is overbased, by which is meant that the total amount of all of calcium, magnesium, zinc and barium present in said salt mixture exceeds the total amount of aromatic carboxylate and fatty aliphatic carboxylate present, on an equivalents basis. As will be seen, in the process of the present invention it is the magnesium or calcium that overbases, as it is added last. The degree of overbasing, that is, the ratio of (Ca+Mg+Zn+Ba present) : (aromatic carboxylates and fatty aliphatic carboxylates present) (on an equivalents basis) is of course greater than 1:1, and can range up to about 1 to 5 wt. % free oxide of the overbasing metal. The ratio of (magnesium and calcium) to zinc present in this mixture can typically fall in the range of 1:1 to about 2:1, on a mole basis.

The process of the present invention by which the mixture of salts of aromatic and aliphatic carboxylatesis prepared includes the following steps, which will be described with reference to the preferred embodiments of the invention wherein the aliphatic acid is stearic acid, the aromatic acid component acid comprises benzoic acid and meta-toluic acids, and the magnesium and zinc salts are formed.

In the first step, the zinc aliphatic carboxylate is formed prior to introduction of magnesium (or other base metal) and prior to introduction of the aromatic acid component. This reaction is preferably carried out by dissolving zinc oxide into molten stearic acid. Preferably, to control the uniformity of the reaction conditions, the zinc oxide is added gradually, in several portions. The total amount of zinc oxide added should be equal to, or slightly less than, the stoichiometrically equivalent amount of acid present. The acid precursor composition to Which the zinc oxide is added is composed of the one or more aliphatic acids, such as stearic acid, although up to about 10 mole percent of the aliphatic acid component can be replaced by one or more of said aromatic acids. The presence of the aromatic acid is preferred, as it is believed to accelerate the reaction of the zinc oxide with the aliphatic acid. In addition, a small amount of water up to about 10% is also preferably present in this mixture, the water having been found to increase the rate of reaction of the zinc oxide with the aliphatic acids. However, excessive amounts of water which would disturb the fluid, monophasic consistency of the reaction mixture should be avoided. Typically, amounts of water comprising up to about 10 wt. % of the reaction mixture can be advantageously present.

The acid precursor composition to which the zinc oxide is initially added should be at a temperature high enough such that the acid is completely molten. However, the temperature should not be so high that the acid or the forming carboxylate product decomposes or enters into competing side reactions forming side products other than the desired zinc carboxylate. Starting temperatures of about 100° C. to 110° C. are suitable. As the progressive portions are added, it will generally be necessary to increase gradually the temperature of this mixture, so as to maintain desired fluidity aiding the dispersion of the zinc oxide into the product and helping to control the temperature of the product itself. However, the temperature at the point at which all the zinc oxide has been added should not exceed about 160° C. Carrying out this step of the process of the present invention in a stirred, heated reactor vessel is highly desirable. Preferably, each portion of zinc oxide that is added to that mixture should be completely dissolved before the next portion is added. Preferably, during this entire step, all water evolved from the mixture is refluxed into the mixture.

When addition of all zinc oxide is completed and the reaction thereof has been completed, the resulting product should be maintained at a temperature sufficient to maintain fluidity of the product, which temperature should also be above the melting point of the aromatic acids which are next to be added to the mixture. Then, in the second step of the process of the present invention, the one or more aromatic acids such as meta-toluic and benzoic acids are stirred into this product. It is preferred that this acid component is added gradually, in portions, to assist in temperature control and control of the uniformity of the product. The temperature of the step should be adequately controlled, typically to no higher than about 160° C. to 170° C., so as to minimize side reactions between zinc carboxylate and the one or more aromatic acids which are added in this step. It is recognized that during this step there may be some equilibrium conversion of zinc aliphatic carboxylate to zinc aromatic carboxylate, with the associated formation of the aliphatic acid. The side reactions which are preferably minimized in this step are not that conversion but other reactions, particularly those in which the aliphatic carboxylate and the one or more aromatic carboxylate anions condense to form a new byproduct with associated formation of carbonate or carbon dioxide.

It is preferred in this step that the mole ratio of the one or more aromatic acids to the aliphatic carboxylate (on an equivalence basis) is 0.5:1 to 2:1, and preferably 0.9:1 to 1.1:1, such as about 1:1.

In the next step of the process of the invention, one or more of magnesium oxide, magnesium hydroxide, calcium oxide, and/or calcium hydroxide, preferably magnesium oxide, is added to the product of the preceding step while that product is maintained in a heated, fluid condition. The total amount of hydroxide(s) and oxide(s) that is added should correspond to a stoichiometric excess (based on the carboxylates content) of up to about 5 wt %. As in the previous steps, it is preferred to add the magnesium and/or calcium oxide or hydroxide gradually, in portions, to assist in maintaining control of the reaction conditions and the physical properties such as the viscosity of the product. It is generally necessary to increase the temperature of the product gradually during the course of the addition added in this step, to maintain adequate fluidity of the product. Again, however, temperature control should be maintained so as to minimize formation of any side reaction products other than the desired formation of the aliphatic and aromatic carboxylates of zinc and magnesium and/or calcium. In general, this means that the temperature of the mixture will rise from typically about 160° C. at the initial addition of the magnesium and/or calcium oxide, and/or hydroxide, to 180°–200° C. at the end of the addition of magnesium and/or calcium oxide and/or hydroxide. The added compound(s) react with the acids present, to form an equilibrium mixture of carboxylates of the zinc and the one or both of magnesium and calcium.

In the next step of the process of the present invention, the product of the preceding step is conditioned to remove a substantial portion, and preferably all, of the volatile components such as unreacted reagents and any side reaction products that may have formed in the preceding steps. The conditioning should be carried out at moderately elevated temperature, under reduced pressure, so as to remove as volatiles those components which otherwise would present a risk of volatilizing from the finished heat stabilizer after incorporation thereof into a polyvinyl chloride formulation. Typical conditioning conditions include holding the product at 190°–200° C., under a pressure on the order of 200 mm Hg, for about an hour. Preferably, the conditioning step can be assisted by, maintaining a nitrogen sparge though the reaction product, typically at a very low flow rate.

After this conditioning step, the product can be poured into any desired recepticle, cooled, hardened, and prepared for further use by means such as crushing or grinding to an appropriate dimension facilitating its incorporation into heat stabilizers and the like.

The overbased carboxylate products formed by the process described herein can be used in a wide variety of heat stabilizer formulations for incorporation into polyvinyl chloride compositions, particularly those compositions which are intended for use in environments that could provoke the emission of "fog" from the polyvinyl chloride product. The components of preferred heat stabilizer compositions are described hereinbelow.

Stabilizer compositions with which the products formed by the present invention are useful include those which also include a carbonate or silicate component which is a heat stabilizer for the polyvinyl chloride. Examples of such compounds abound and are well known in the field. Preferred examples include inorganic metal silicates such as mono-or condensed silicates of sodium, calcium, magnesium, aluminum, and zinc. Other preferred examples include dimetallic and polymetallic carbonates and silicates, such as magnesium aluminum carbonate, a particularly preferred example of which is hydrotalcite (corresponding to the formula $Mg_{1-x}Al_x(OH)_2(CO_3)_{x/2} \cdot mH_2O$ wherein x is between 0 and 1). Yet other preferred examples include sodium aluminum silicates, and calcium aluminum silicates, especially zeolites.

Another component of the stabilizer compositions, which is optional but preferred, is a polyol component comprising one or more polyol compounds containing 2 to 10 hydroxyl groups. The polyols useful in this invention contain generally 2 to 20 carbon atoms, and may contain 1 or more hetero atoms such as, especially, one or more nitrogen atoms. Examples of suitable polyol compounds include ethylene glycol, propylene glycol, glycerol, sorbitol, mannitol, xylitol, pentaerythritol, dipentaerythritol, tripentaerythritol, and tris (2-hydroxyethyl) isocyanurate, which latter compound is a preferred polyol in the practice of this invention.

To achieve the desired combination of properties using stabilizers made with the process of the present invention, the one or more polyols comprising the aforementioned polyol component should be present in such an amount that the polyols do not cause the stabilizer to exhibit increased fogging. By this is meant that the polyol should not volatilize at all, or it should not volatilize to such an extent that it negates the effect of the overbasing in reducing the overall tendency of the stabilizer to cause fogging. Subject to this consideration, the ratio by weight of the overbased mixture of salts to the amount of the one or more polyols present is generally in the range of about 1:1 to about 2:1, and more preferably about 1.5:1 to about 2:1. The polyol tris(2-hydroxyethyl) isocyanurate is particularly preferred because of its low fogging behavior.

It has been determined that the presence of the additional overbasing amount of magnesium, or calcium, beyond the amount necessary to achieve neutralization of the aromatic carboxylate and of any fatty alkanoic and/or alkenoic carboxylate present, provides a significant and unexpected improvement in that the stabilizer composition exhibits a greatly reduced tendency to cause "fogging" (that is, a reduced tendency to volatilize when heated to moderately elevated temperatures). In addition, the polyol component contributes improved heat processing stability without contributing to windshield fogging, that is, without contributing to volatilization of the stabilizer component. Furthermore, these stabilizer compositions contribute, to polyvinyl chloride resin compositions containing these compositions, satisfactory stability against heat-mediated degradation and satisfactory processing stability. The overbased carboxylate composition does not detract from the stability against heat-mediated degradation and processing stability of the polyvinyl chloride formulations containing this stabilizer.

Stabilizer compositions using products of the process of the present invention preferably include one or more optional but preferred constituents. One such constituent is a beta-diketone component comprising one or more beta-diketones having the structural formula $R^1$—C(O)—CH$_2$—C(O)—$R^2$ wherein $R^1$ is alkyl having about 10 to about 30 carbon atoms, and $R^2$ is phenyl, phenyl substituted with up to 3 lower ($C_1$-$C_6$) alkyl groups, or alkyl containing 1 to 30 carbon atoms.

Examples of suitable beta-diketones include benzoylacetone, lauroylbenzoylmethane, myristoylbenzoylemethane, palmitoylbenzoylmethane, stearoylbenzoylmethane, behenoylbenzoylmethane, dilauroylmethane, dimyristoylmethane, dipalmitoylmethane, distearoylmethane, dibehenoylmethane, lauroylmyristoylmethane, lauroylpalmitoylmethane, lauroylstearoylmethane, lauroylbehenoylmethane, myristoylpalmitoylmethane, myristoylstearoylmethane, myristoylbehenoylmethane, palmitoylstearoylmethane, palmitoylbehenoylmethane, stearoylbehenoylmethane, lauroyl toluyl methane, stearoyl toluyl methane, lauroyl xyloyl methane, stearoyl xyloyl methane, 1-phenyltriacontane-1, 3-dione, acetyltetralone, palmitoyltetralone, stearoyltetralone, palmitoylcyclohexanone, stearoylcyclohexanone and (paramethoxybenzoyl)-stearoylmethane. These compounds are utilized in amounts of between about 0.05 and 5% by weight relative to the weight of the PVC and, preferably, between about 0.1 and 1% by weight.

It is also advantageous to include in the stabilizer compositions or in polyvinyl chloride products containing the stabilizer compositions, a perchlorate component comprising one or more perchlorate compounds. Examples include metal-perchlorate salts such as barium perchlorate, magnesium perchlorate, aluminum perchlorate, sodium perchlorate, calcium perchlorate, and the like. Other examples include the sodium perchlorate/calcium silicate composition disclosed in U.S. Pat. No. 5,225,108, the disclosure of which is hereby incorporated herein by reference. Other examples include perchlorate-derivatized hydrotalcite compounds such as those disclosed in U.S. Pat. No. 4,861,816, the disclosure of which is hereby incorporated herein by reference. The latter compounds are said to correspond to the formula $Mg_{1-x}Al_x(OH)_2 \cdot (ClO_4)_2 \cdot mH_2O$ wherein m represents a positive number and x is greater than 0 and is less than or equal to 0.5.

The perchlorate helps to retard or prevent discoloration and chemical interaction between polyvinyl chloride and adjacent polyurethane materials, such as encountered in shaped automobile parts. Parts can be "adjacent" yet subject to such undesired interaction if they are in physical contact with each other or if they are near each other, not touching, such that an amine byproduct from the polyurethane volatilizes and comes into contact with the polyvinyl chloride formulation. The one or more perchlorate compounds are preferably present in an amount which is about 10 to about 40 wt. % of the stabilizer composition, and more preferably about 15 to about 35 wt. % of the stabilizer composition.

The stabilizer compositions are preferably used to advantage in combination with vinyl halide resins, preferably polyvinyl chloride resins. The term "polyvinyl chloride" as used herein is inclusive of any polymer formed at least in part of the recurring group (—CHCl—CX$_2$—)$_p$ and having a chlorine content in excess of 40%. In this formula, each of the X groups can be either hydrogen or chlorine, and p is the number of units in each polymer chain. In polyvinyl chloride homopolymers, each of the X groups is hydrogen. Thus, the terms, "PVC" and "polyvinyl chloride" include not only polyvinyl chloride homopolymers but also after—chlorinated polyvinyl chlorides, as well as copolymers of vinyl chloride in a major proportion with other copolymerizable monomers in moderate proportion such as copolymers of vinyl chloride and vinyl acetate, copolymers of vinyl chloride with maleic or fumaric acids or esters, and copolymers of vinyl chloride with styrene. The stabilizer compositions are effective also with mixtures of polyvinyl chloride in major proportion with a minor proportion of other synthetic resins such as chlorinated polyethylene or copolymers of acrylonitrile, butylene and styrene.

Stabilizer compositions incorporating a product of the process of the present invention can be used with plasticized polyvinyl chloride resin compositions of conventional formulation. Conventional plasticizers well known to those skilled in the art can be employed such as, for example, dioctyl phthalate, octyl diphenylphosphate, and epoxidized soybean oil. Particularly useful plasticizers are the epoxidized esters having form 20 to 150 carbon atoms.

The stabilizer compositions are used in small amounts effective to impart resistance to heat-mediated deterioration of the PVC or other polyvinyl chloride resin. That is, "heat-mediated deterioration" includes deterioration which is due to exposure to excessive heat, as well as deterioration which is initiated or accelerated by exposure to heat. Effective heat stability is afforded generally by adding about 0.5 to about 5 phr (parts by weight per hundred parts by weight of the polyvinyl chloride) of the stabilizer. Preferred amounts are generally in the range of about 1 to about 4 phr. The stabilizer can be compounded into the resin formulation in accordance with conventional compounding techniques abundantly familiar to one of ordinary skill in this art, wherein the stabilizer is finely divided so as to aid its dispersibility into the resin and is then dispersed therein by physical mixing means.

The stabilized polyvinyl chloride resin composition comprising these components can also contain conventional additional additives such as antioxidants, lubricants, flame retardants, fillers, pigments, UV absorbers and the like, in relative amounts effective to fulfill the desired functions of each such ingredient. These ingredients can be added, if desired, prior to, during, or subsequent to the step in which the heat stabilizer composition of the present invention is compounded into the polyvinyl chloride composition.

Among the preferred antioxidants are phenolics, generally used in amounts up to about 0.5 wt. % of the polyvinyl chloride resin composition, such as 2,6-di-t-butyl-4-methylphenol, 2-t-butyl-4-methoxyphenol, 3-t-butyl-4-methoxyphenol, n-propylgallate, n-dodecylgallate, dilauryl thiodipropionate, and the like.

Each of the starting materials used herein, whether intended to be reactants or as unreacting additives, should be provided in a high-purity form, preferably 97% or higher purity, and free of existing volatilized contaminants.

The invention is further described in the following example, which is included for purposes of illustration and not for limitation of the scope of that which the applicants consider to be the invention.

EXAMPLE 1

Under a nitrogen flow of 0.6 liters per minute, 571.5 g stearic acid (90 wt. % purity) and 23.5 g benzoic acid were charged into a reactor equipped with a stirrer and an electrical heating mantle at room temperature. Electrical heating was started to melt the material. The temperature slowly increased to 100°–105° C. when the mixture of acids was completely melted. At this point 10 ml water and 22.6 g ZnO were carefully added under vigorous stirring and the temperature increased to 120° C. When the ZnO was completely dissolved (usually after 10–15 min.) an additional 60 g ZnO was charged in six portions of 10 g, each after 10 min. Each portion of Zno should be dissolved before the next portion is added. After the third portion the temperature was increased to 140° C. After the last portion, the temperature was increased to 160° C. and the mixture stirred until all ZnO was completely dissolved (15–20 min.). During the ZnO addition total reflux of the water was maintained.

When all ZnO was dissolved and 160° C. was reached, 139 g m-toluic and 100 g benzoic acids were charged in portions, while maintaining the temperature above 140° C. To the homogeneous liquid mixture at 160° C., 10 g MgO was added. .When the reactrod with MgO had moderated, the rest (58 g) was charged in four portions of 10 g MgO and the last one of 18g MgO. The first two were charged at 30 min intervals and the rest after 15 minutes. At the beginning the MgO completely dissolved but after the stoichiometric amount had been added, the rest of the MgO remained in suspension. After the second portion of MgO the temperature was increased to 170° C. and after the fourth portion to 180° C. After the MgO addition was completed the reaction mixture was kept at 195°–200° C. for 1.0 hour under a pressure of 200 mmHg and a very low sparge of nitrogen. The resulting material was poured into pans, and after cooling and hardening it was chopped and ground.

The product when compounded into PVC in stabilizers gave a good thermic stability of PVC. The product itself ("neat") and in PVC compounds emits no fog, and has a low lubrication effect on PVC.

What is claimed is:

1. A process for producing an overbased mixture of carboxylate salts of one or more aromatic acids selected from the group consisting of benzoic acid and benzoic acid substituted with one, two or three alkyl groups each of which contain from 1 to 6 carbon atoms, and one or more aliphatic fatty acids containing about 12 to 30 carbon atoms with zinc and of magnesium, comprising:

(a) dissolving zinc oxide in a molten acid precursor composed of at least a stoichiometrically equivalent quantity of said one or more aliphatic fatty acids wherein up to about 10 mole percent of the amount of said one or more aliphatic fatty acids present is replaced by one or more of said aromatic acids, in the presence of water in an amount up to about 10 wt %, said amount of water being effective to increase the rate of reaction of said zinc oxide with said one or more aliphatic fatty acids, under conditions effective to achieve complete reaction between said zinc oxide and said acid precursor to maximize formation of the corresponding zinc carboxylate while minimizing formation of other reaction products and to provide thereby a liquid reaction product;

(b) adding said one or more aromatic acids to said liquid reaction product under conditions effective to maintain it in the liquid state while minimizing side reactions between said zinc carboxylate and said aromatic acids, wherein the mole ratio of said one or more aromatic acids to aliphatic carboxylates is 0.5:1 to 2:1;

(c) adding magnesium oxide, either magnesium hydroxide, or mixtures thereof to the product of step (b), in an amount effective to provide a stoichiometric excess thereof up to about 5 wt. % based on the carboxylate, under conditions effective to achieve complete reaction of said one or more aromatic acids with said added compound or compounds to form said mixture of carboxylate salts while minimizing formation of side reaction products; and (d) conditioning the product of step (c) under conditions effective to volatilize and remove therefrom unreacted products and side reaction products.

2. The process of claim 1 wherein magnesium oxide is added in step (c).

3. The process of claim 1 wherein in steps (a) and (c), oxide is added in successive portions and the temperature of the material to which the oxide is added is increased over the course of said addition.

4. The process of claim 2 wherein in step (a) the temperature of said acid precursor is increased from about 100° C. when addition of zinc oxide is begun, to about 160° C. after addition of zinc oxide is discontinued.

5. The process of claim 2 wherein in step (c) the temperature of said product of step (b) is increased from about 160° C. when addition thereto is begun, to about 180° C.–190° C. after said addition is discontinued.

6. The process of claim 1 wherein said one or more aliphatic fatty acids is stearic acid.

7. The process of claim 1 wherein said one or more aromatic acids are selected from the group consisting of benzoic acid, all isomers of toluic acid, and mixtures thereof.

8. The process of claim 6 wherein said one or more aromatic acids are selected from the group consisting of benzoic acid, all isomers of toluic acid, and mixtures thereof.

9. The process of claim 8 wherein magnesium oxide is added in step (c).

* * * * *

UNITED STATES PATENT AND TRADEMARK OFFICE
CERTIFICATE OF CORRECTION

PATENT NO. : 5,656,202
DATED : August 12, 1997
INVENTOR(S) : Lawrence R. Brecker, et al.

It is certified that error appears in the above-identified patent and that said Letters Patent is hereby corrected as shown below:

Column 1, line 49: before "when" delete --.--

Column 4, line 14: "carboxylatesis" should read --carboxylate is--

Column 4, line 30: "Which" should read --which--

Column 9, line 10: "Zno" should read --ZnO--

Column 9, line 20: before "When" (2nd occurrence) delete --.--

Column 9, line 44, Claim 1: delete --of--

Signed and Sealed this

Third Day of November, 1998

*Attest:*

BRUCE LEHMAN

*Attesting Officer*  *Commissioner of Patents and Trademarks*